United States Patent Office 3,402,599
Patented Sept. 24, 1968

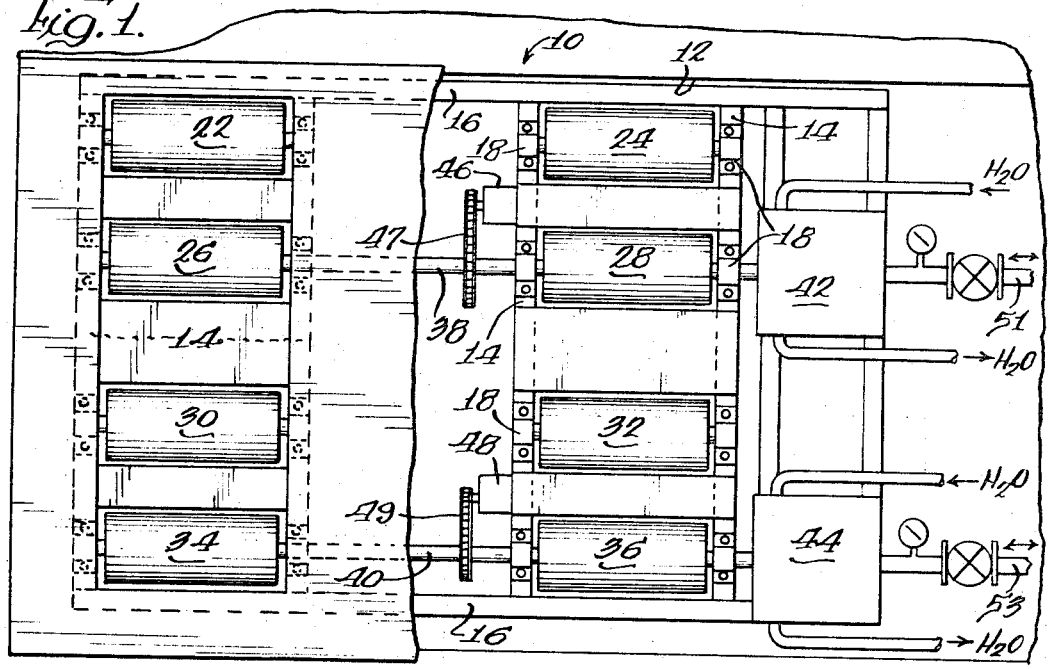

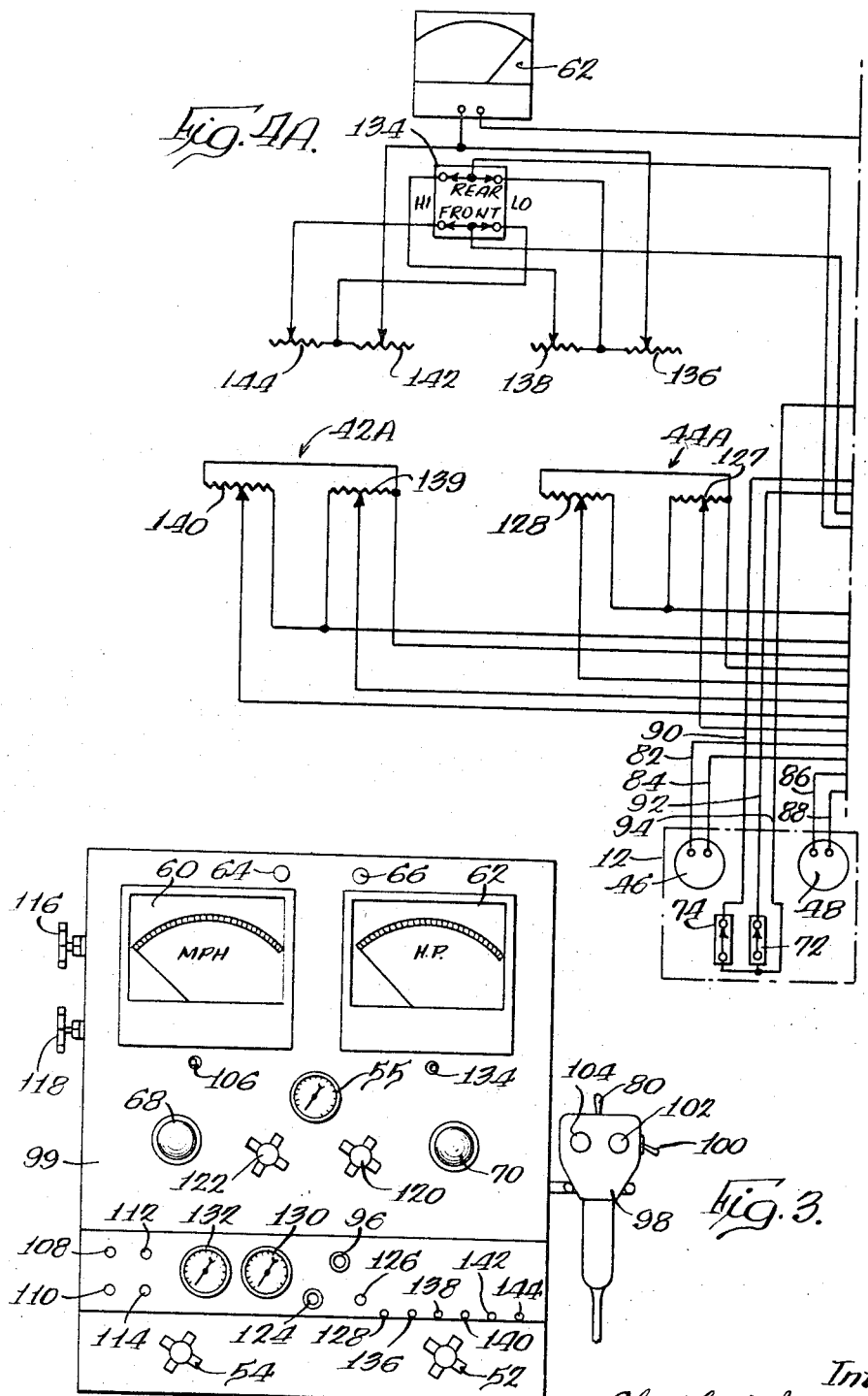

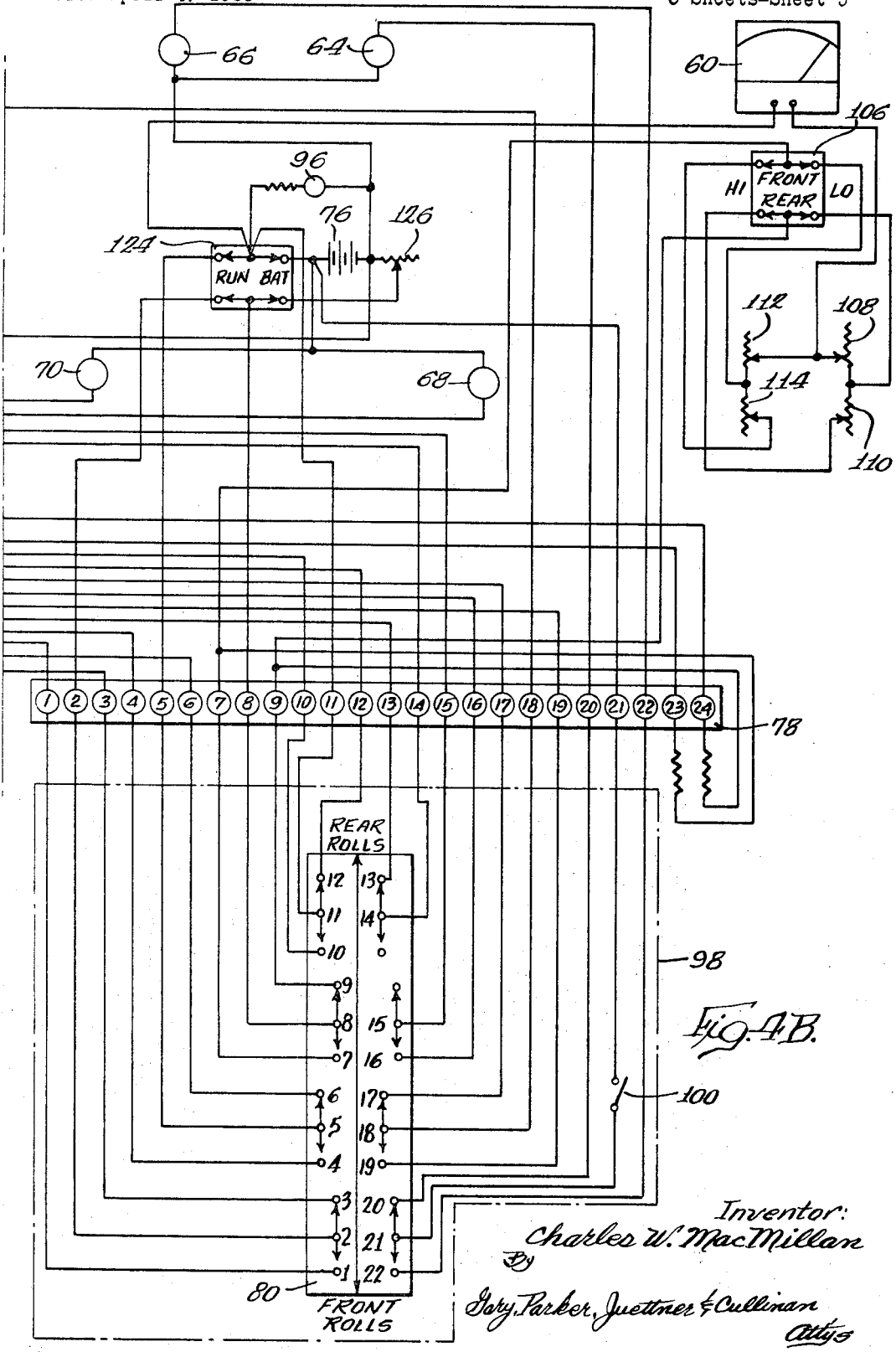

3,402,599
VEHICLE TESTING UNIT
Charles W. MacMillan, Rock Island, Ill., assignor to Bear Manufacturing Company, Rock Island, Ill., a corporation of Delaware
Filed Apr. 5, 1966, Ser. No. 540,297
6 Claims. (Cl. 73—117)

ABSTRACT OF THE DISCLOSURE

A vehicle chassis dynamometer having means for determining both wheel speed and torque, thereby to provide a direct indication of vehicle horsepower output, is herein characterized, first, by improved means for field calibration of the device of such simple character that calibration can be checked and corrected by a regular operator, without necessity for calling in a factory representative or other specialist; and second, by a twin-axle chassis dynamometer utilizing only one set of instruments and including individual calibration means and a switchover structure whereby the output of each axle may be selectively and substantially instantaneously indicated for purposes of independent test and rapid comparison of the output of the two axles.

---

The present invention relates to vehicle testing devices and more particularly to a vehicle chassis dynamometer for performing certain tests on automotive vehicles.

An object of this invention is to provide an improved twin-axle drive chassis dynamometer by which test can be made on either the forward or rear wheels of a tandem-axle of a vehicle without the necessity of moving the vehicle between tests.

Another object is to provide a hydraulic arrangement and electrical instrumentation which will allow tests to be made on either the forward or rear wheels of a tandem-axle of a vehicle independently or together.

A further object is to provide a hydraulic arrangement and electrical instrumentation whereby tests may alternately be made on the forward wheels and the rear wheels of a tandem-axle by simply flipping an electrical switch to shift substantially instantaneously from one set of wheels to the other.

Another object is to provide an instrument panel and associated electrical circuitry whereby only one set of instruments are necessary to perform tests on both the forward and rear wheels of a tandem-axle.

A still further object is the provision of simple means for field calibration of the instruments associated with the dynanometer unit so that the calibration can be performed by a regular operator without necessity for bringing in a specialist, such as a factory representative, to perform the calibration.

Other objects and advantages will become apparent in the following detailed description.

Now, in order to acquaint those skilled in the art with the manner of making and using my improved apparatus, I shall describe, in connection with the accompanying drawings, a preferred embodiment of the apparatus of the invention and a preferred manner of making and using the same.

In the drawings:

FIGURE 1 is a plan view of the rolls of the chassis dynamometer testing unit mounted in a suitable framework;

FIGURE 2 is a hydraulic schematic diagram of the chassis dynamometer panel;

FIGURE 3 is a front view in elevation of an instrument panel utilized in conjunction with the dynamometer unit;

FIGURES 4A and 4B are a schematic representation of the electrical circuit diagram used in connection with the testing device.

Referring now to the drawings 10 indicates generally a twin axle vehicle drive chassis dynamometer unit. This device may be disposed in a pit 12 of a garage or shop area. A frame structure supports the device and may comprise channel irons 14 running the length of the pit and channel irons 16 disposed at the ends of the pit running transversely to and interconnecting with the channel irons 14.

A plurality of rolls are supported on the channel irons 14 by a plurality of pillow blocks 18 each carrying a bearing for supporting a shaft extending through each of the rolls.

Since the device is designed to test principally vehicles having tandem-axles, there are eight rolls in all. These are arranged in four pairs, the rolls of each pair being axially aligned and spaced from each other. The first pair includes independent or idler rolls 22 and 24; the second pair includes rolls 26 and 28 mounted on a common shaft 38; the third pair includes independent or idler rolls 30 and 32; and the fourth pair includes rolls 34 and 36 mounted on a common shaft 40. The rows 22, 24, 26 and 28 are the front rolls adapted to receive the forward wheels of the tandem-axle of a vehicle to be tested, and the rolls 30, 32, 34 and 36 are the rear rolls adapted to receive the rear wheels of the tandem-axle unit. As is known, one set of rolls, e.g., the rear rolls 30–36, is shiftable forwardly and rearwardly as a unit on the frame 14–16 to accommodate tandem-axle assemblies of various fore to aft spacings.

A load unit 42 is coupled to the shaft 38 of the power rolls 26 and 28, and a similar load unit 44 is coupled to the shaft 40 of the power rolls 34 and 36. The load units 42 and 44 may be of the type disclosed in U.S. Patent No. 3,068,689 to A. J. Warsaw, for example.

A tachometer generator 46 is mounted on the frame structure and drivingly connected to the front power rolls 26 and 28 by a suitable drive, such as a chain and sprocket drive 47. Another tachometer generator 48 is mounted on the frame structure and drivingly connected to the rear power rolls 34 and 36 by a suitable chain and sprocket drive 49.

The dynamometer unit includes a hydraulic system (FIG. 2) for actuating the dynamometer controls, instrumentation (FIG. 4) for making the desired tests on the unit, and manual operating means (FIG. 3) for the hydraulic and electrical systems.

The means which applies the load to the brake shoes (not shown) in the load units 42 and 44 comprises a pair of power clusters (not shown) of conventional structure. These clusters, which are actuated by air under pressure, comprise fluid pressure transducers for converting the air pressure to relatively high hydraulic pressure in a closed hydraulic circuit, the line of hydraulic pressure supply therefrom being indicated at 50 in FIG. 2. From the supply 50, high pressure hydraulic fluid is transmitted to the brake shoes of load unit 42 via line 51 through valve 52, and to the load unit 44 via line 53 through valve 54. This braking pressure is indicated on a braking pressure gauge 55 on the instrument panel. Each load unit also includes a return line from the torque cylinder thereof, namely, a line 56 from the front load unit 42 leading to a front roll analyzer 42A and a line 58 from the rear load unit 44 leading to a rear roll analyzer 44A. As will become apparent, each analyzer is operated by and in proportion to the respective load unit for purposes of indicating vehicle performance. Additionally, the load units are equipped with means for passing water therethrough for cooling purposes, as indicated in FIG. 1.

One of the important features of this invention is in connection with the instrumentation itself. For example, the electrical circuit includes means for making measurements from either the front pair of wheels or the rear pair independently without moving the vehicle or from the front and rear pair of wheels as a unit. Another important feature is the ease and facility with which the unit can be calibrated by the operator. This is particularly important because in the absence of a simple means for calibrating the equipment, a factory representative would have to be called in to perform the calibration process.

The instrumentation and electrical circuitry provided in conjunction with the dynamometer unit is shown in FIGURES 4A and 4B.

The instrumentation includes the analyzers 42A and 44A, the generators 46 and 48, a speed or miles per hour meter 60, a horsepower meter 62, pilot indicator lights 64 and 66, temperature warning lights 68 and 70, temperature switches 72 and 74, a battery 76, a terminal block 78, a selector switch 80 and an on-off switch 100. As indicated by dot-dash lines, the tachometer generators 46 and 48 and the thermostatic switches 72 and 74 are located in the dynamometer pit 12, the switches 80 and 100 are located in a hand-held instrument 98, and the remainder of the circuitry is enclosed in the instrument panel 99, shown in FIGURE 3.

The only electrical connections communicating with the pit 12 consists of two conductors 82 and 84 from the tachometer generator 46 associated with the front rolls, two conductors 86 and 88 from the tachometer generator 48 associated with the rear rolls, and conductors 90, 92 and 94 for the front and rear temperature switches 72 and 74.

The generators 46 and 48 are connected into the terminal block 78 through the switch 80 which is an eight pole double throw switch. The terminal block 78 comprises a number of terminals numbered 1 through 24, and a series of leads connect these terminals with corresponding connections in the switch 80. No external source of electrical power is required. The battery 76 preferably is a stock type 12 volt battery, and it supplies current only for the temperature warning lights 68 and 70, the indicator lights 64 and 66, and a calibration indicating light 96. Additionally, it serves as a power supply during horsepower calibration of the unit.

The hand control unit 98 houses the switches 80 and 100. The switch 100 is simply an on-off switch. The switch 80 preferably is an eight pole double throw switch arranged so that in one position it is connected to the front analoger 42A and generator 46 and in the other position to the rear analoger 44A and generator 48. When the switch 80 is moved to one of two positions, it closes the circuit between the front signal means 42A and 46 and various units connected into the terminal block 78, whereby the power and speed of the front set of rolls is transmitted to the miles per hour meter 60 and the horsepower meter 62. When the switch 80 is moved to the other position, which is shown in FIG. 4, it closes the circuit between the rear signal means 44A and 48 and other units connected into terminal block 78, whereby the speed and power of the rear rolls is transmitted to the two meters 60 and 62. Consequently the speed and power delivered by either the front rolls or rear rolls can be measured independently; and almost simultaneously merely by flipping the switch 80.

The hand control unit 98 also houses a pair of valve buttons 102 and 104 which are part of the hydraulic control system and which through connections (not shown) are adapted for loading and unloading the hydraulic system.

As previously noted, one of the important features of this invention is the facility for ease of calibration. The instruments may be calibrated at any time it becomes desirable to check their accuracy. The speed calibration is the most important and must be performed prior to making any horsepower calibrations. To calibrate the miles per hour meter accurately for both the front and rear rolls, it is necessary to drive the rolls and any vehicle, such as a light truck or passenger car, may be used for the purpose. One set of rolls is calibrated at a time with the switch 100 turned to the "ON" position. Assuming that the rear power rolls 34 and 36 are to be calibrated first, switch 80 is moved to a first position, in this case toward the face of the hand control unit 98, to the position shown in FIG. 4, to engage the contact sets 2–3, 5–6, 8–9, 11–12, 13–14, 17–18 and 20–21 shown in FIG. 4. With switch 80 set as indicated and switch 100 closed, the rear roll indicator light 64 is illuminated by battery 76 via the leads from the battery, contact set 20–21, and switch 100. When the vehicle is run on the rolls 30, 32, 34 and 36, drive will be transmitted to the power rolls 34 and 36 which in turn will drive the generator 48 through the chain and sprocket drive 49. This will energize the miles per hour meter 60 via the contact set 3–2, the left hand or "run" contact sets of the switch 124, contact set 8–9, switch 106 and calibration resistor 108–110, and contact set 5–6. Using a strobe light in conjunction with marks on the rolls 34–36, the speed of the vehicle is adjusted to rotate the rolls at 900 r.p.m. (33.4 m.p.h.).

With the rolls thus driven, double pole double throw meter switch 106 associated with the miles per hour meter 60 is thrown to low range (the right hand contact sets) for calibration of the low speed scale of the meter. The low range variable resistor 108 for the rear rolls and generator 48 is adjusted first so that the speed on the low speed scale of the meter 60 indicates exactly 33.4 m.p.h. at the instant the pattern marked on the rolls 34–36 appears stationary under the strobe light (900 r.p.m.). After the low range of the meter is set, the vehicle may be speeded up to 40 m.p.h. and held constant while the meter switch 106 is thrown to high range (the left hand contact sets) and the rear roll high range variable resistor 110 (which is in series with resistor 108) is adjusted to bring the speed to 40 on the high range scale of the meter 60.

After setting the miles per hour meter for the rear set of rolls, the vehicle is placed on the front rolls 22, 24, 26 and 28 and the same calibrating procedure as described above is repeated after throwing switch 80 on the hand control unit 98 to the other or forward position, i.e., to engage contact sets 1–2, 4–5, 7–8, 10–11, 15–16, 18–19 and 21–22 shown in FIG. 4. The indicator light 66 will now be lit via the battery 76, contact set 22–21 and switch 100 showing that the front set of rolls are connected in the electrical circuit. Specifically, the generator 46 is connected to the meter 60 via contact set 1–2, the left hand or "run" contact sets of switch 124, contact set 8–7, switch 106 and calibration resistors 112–114, and contact set 5–4. The front roll low range variable resistor 112 and high range variable resistor 114 are now available to be adjusted in the same manner as variable resistors 108 and 110.

After the speed or miles per hour meter 60 has been accurately calibrated for both sets of rolls and both speed ranges, the vehicle is no longer required for calibration purposes. This is possible because supply current available from the battery 76 within the instrument panel 99 is used to exactly duplicate the current from the generators 46 and 48.

To proceed now with the horsepower calibration, the valves 52, 54, a pair of cross-over preload valves 116 and 118 and control valves 120 and 122 for the front and rear analogers 42A and 44A respectively are all opened. The switch 80 on the hand control unit 98 is thrown to the rear rolls position first, thereby illuminating light 64. Switch 124 is thrown to the battery position (the right hand contact sets in FIG. 4) so that current for calibration of the horsepower meter will be supplied by the battery 76. Light 96 will light up when this is done. A variable resistor control 126 now functions as an artificial speed set via the right hand contact sets of switch 124, switch 106, resistor 108 and contact set 9–8. The control 126 is manipulated so that the miles per hour meter 60 reads exactly 45 m.p.h. on its low range scale, whereupon the battery 76 and resistor 126 supply a power factor to the horsepower circuit equivalent to operation of the rear rolls 34–36 at 45 m.p.h. Specifically, this base value is coupled into a rear roll horsepower circuit comprising switch 124, contact set 11–12, rear roll analoger 44A including potentiometer 127 operated by and proportional to the rear roll load unit 44, contact set 13–14, switch 134 and calibration resistors 136–138, horsepower meter 62, contact 18–17, a zero set resistor 128 for the potentiometer 127, coupler 24, and contact set 9–8. All hydraulic pressure is initially released from the system by holding the unload valve 104 down. The zero set variable resistor 128 for the rear rolls is then adjusted to make the horsepower meter 62 rear zero. Then four hundred and thirty-three (433) pounds of hydraulic pressure is applied to the circuit, as indicated by front and rear torque gauges 130 and 132 connected respectively to the torque cylinder lines 56 and 58, by operating the loading button 102 in the hand control unit 98. With the speed meter 60 showing 45 m.p.h., the rear torque gauge showing 433 pounds and the horsepower meter switch 134 set on low range, variable resistor 136 for the rear unit is adjusted until the horsepower meter 62 reads exactly 100 horsepower on its low range scale. Switch 134 is then flipped to high range and variable resistor 138 (in series with resistor 136) is adjusted so that the horsepower meter 62 reads 100 on its high range scale.

To conduct the same calibration procedure for the front set of rolls 22, 24, 26 and 28, the switch 80 is thrown to the forward roll position at which time the light 66 should light up. Then the same procedure is followed as just described in connection with the rear rolls. Specifically, the artificial speed function of battery 76 and control 126 as correlated to the front rolls is coupled in a forward roll horsepower circuit including switch 124, contact set 11–10, front roll analoger 42A including potentiometer 139, contact set 16–15, switch 134 and calibration resistors 142–144, horsepower meter 62, contact set 18–19, a zero set resistor 140 for the potentiometer 139, coupler 23, and contact set 7–8. Thus, zero set variable resistor trimmer 140 and variable resistor controls 142 and 144 are adjustable in the same manner as described above for controls 128, 136 and 138 to calibrate for the front rolls.

After the horsepower meter 62 is calibrated for both the front and rear rolls, the pressure is released by operating button 104 until approximately 30 pounds is indicated on torque line gauges 130 and 132. This is a preload on the hydraulic system which will be locked in the system and remain therein to prevent any sponginess of operation which may be due to small amounts of air remaining in the system. With the pressure at approximately 30 pounds, the cross-over preload valves 116 and 118 are closed. These cross-over valves are used only to introduce an artificial pressure to the torque system for calibration and to apply or relieve a preload.

When the meters 60 and 62 have been calibrated, the preload established, the valves 116 and 118 closed and the switch 124 moved to "run" position (the left hand contacts), the test unit is ready for operation.

The unit described is particularly adapted to perform tests on a vehicle having a twin-axle drive, but a vehicle having a single-axle drive may also be tested thereon.

Tandem or twin-axle drives may be found in four different arrangements as follows:

(a) Both axles are driven by propeller shafts and an inter-axle differential is provided which may be either engaged or disengaged.

(b) Two axles in which one axle at the rear only is driven by a propeller shaft while belts interconnecting the rear and forward axles provide some driving force for the forward axle.

(c) Two axles in which the forward axle is driven by a propeller shaft while belts extend to the rear to exert some driving force on the rear wheels.

(d) Two axles in which only one axle is driven and the other is merely an idler.

The twin-axle chassis dynamometer disclosed herein can test any of the above vehicles. This can be done by selectively opening and closing the valves 54 and 56 and selectively operating the switch 80. For example, if valve 54 is closed and valve 56 remains open, braking pressure will be applied to the rear load unit but not to the front load unit 42. If valve 56 is closed, braking pressure will not be applied to the rear load unit 44.

For testing a twin-axle drive vehicle with an inter-axle differential engaged, both valves 54 and 56 must be open. If the inter-axle differential of such a vehicle is disengaged, the vehicle may be tested either with valve 54 or 56 open or both open. If either valve 54 or 56 is closed while the other remains open, all the power transmitted to the wheels will be measured through the load unit that is connected. If both valves 54 and 56 are open, the power is divided between the two load units 42 and 44 and the power as indicated on the meter 62 should be doubled. This can be done directly by reading the high range scale while the HI–LO range switch 134 is in the LO position.

When testing vehicles with the inter-axle differential engaged, or when testing vehicles in which one axle is driven and coupled with the other by a pulley drive, for example, the power transmitted to the front and rear rolls may be added to obtain the total power.

It should be noted that a vehicle with a single-drive axle may also be tested on this unit. To do this, it is only necessary to close valve 54 or 56, i.e., whichever valve is associated with the rolls not being used.

Since the testing of commercial vehicles is performed for comparison purposes to determine whether or not a vehicle is properly operating, it is important that the engine be operated as identically as possible each time a particular test is made. This may be achieved by use of the tachometer in the vehicle in conjunction with the engine ratings. Tests on a unit of this type should be performed in the highest gear or straight through drive. When running a peak horsepower test, the engine should be thoroughly warmed first and then brought up to the specified r.p.m. such, for example, as 2100 r.p.m. The load is then very gently applied by using valve button 102 on the hand control unit 98. At the same time, the vehicle accelerator is depressed to prevent the load from reducing the speed of the engine. By careful manipulation of the valve loading button 102 and the vehicle throttle, the throttle may be finally held against the floor while maintaining the proper r.p.m. on its tachometer under constant conditions. At this stage a sufficient load will have been applied to produce the maximum horsepower reading and the horsepower meter 62 may be read under these conditions.

With the switch 80 in rear roll position, the tachometer generator 48 is connected to the speed meter 60 in the manner previously described, and the speed factor or thus generated current is fed to the analoger 44A via the terminal board connectors 9 and 24. At the same time, the potentiometer 127 of the analoger has moved proportionally to the load applied to the rear roll brake unit 44 whereby the meter 62 (now operated on generated current—not the battery) indicates the horsepower output of the rear wheels of the tandem axle.

In like manner, when the switch 80 is flipped to front roll position, the generator 46 is connected to the meter 60 as previously described, and the thus generated current or speed factor is fed via terminal board connectors 7 and 23 to the analoger 42A, where the same is combined with the load factor of potentiometer 139 to indicate on meter 62 the horsepower output of the front wheels of the tandem axle.

Thus, if both axles of the vehicle are driving, it is only necessary to flip switch 80 to the front and rear units alternately and take the two readings. Since the switch operates almost instantaneously, and in an interval so short that there is no variation in vehicle performance, the performance of each axle under identical conditions is readily determined and compared. If the readings on the two axles vary substantially, the individual readings are added to obtain total power output. If these readings are identical or very close together, total power output may be read directly from the high range scale on the horsepower meter 62 while the switch 134 is in low range.

Thus it is apparent that I have advantageously provided a twin-axle chassis dynamometer which can be easily calibrated at its situs without any ancillary equipment and without bringing in factory representatives to perform this function. The twin-axle chassis dynamometer with its associated instrumentation also provides an easy means for taking measurements from each of the twin-axles by simple electrical switching means, thus permitting measurement of power and speed of each axle for purposes of addition or comparison.

In addition, the unit is adapted to test a vehicle having either a twin rear axle or a single rear axle.

While I have shown and described what I regard to be the preferred embodiment of my improved apparatus, it will be appreciated that various changes and rearrangements may be made therein without departing from the scope of the invention.

I claim:

1. In a vehicle testing device the combination comprising:
   roll means adapted to support and be driven by vehicle wheels, said roll means including first and second roll means for supporting the two sets of rear wheels of a tandem-axle vehicle;
   load absorption means connected to each of said first and second roll means;
   generator means connected to each of said first and second roll means to be driven thereby; a meter means for indicating the power developed by vehicle wheels driving said roll means;
   electrical circuit means for connecting the load absorption means and generator means connected to each of said first and second roll means to said meter means; power meter calibration means for the load absorption means and generator means of each roll means;
   electrical switch means in said electrical circuit means for selectively connecting the load absorption means and generator means of each roll means and the respective meter calibration means into said electrical circuit means whereby the power developed at either said first or second roll means may be selectively and substantially instantaneously alternately transmitted to said power meter means;
   a speed meter means for indicating the speed of the vehicle wheels driving said rolls means; and speed meter calibration means for the generator means of each roll means;
   said electrical switch means selectively connecting the generator means of each roll means and the respective speed meter calibration means to said speed meter means whereby the speed of the wheels of the vehicle being tested on either said first or second roll means may be selectively and substantially instantaneously transmitted to said speed meter means.

2. In a vehicle testing device the combination comprising:
   roll means to support and be driven by vehicle wheels, said roll means including first and second roll means for supporting the two sets of rear wheels of a tandem-axle vehicle;
   load absorption means connected to each of said first and second roll means;
   generator means connected to each of said first and second roll means to be driven thereby; a meter means for indicating the power developed by vehicle wheels driving said roll means;
   electrical circuit means for connecting the load absorption means and generator means connected to each of said first and second roll means to said meter means; power meter calibration means for the load absorption means and generator means of each roll means;
   electrical switch means in said electrical circuit means for selectively connecting the load absorption means and generator means of each roll means and the respective meter calibration means into said electrical circuit means whereby the power developed at either said first or second roll means may be selectively and substantially instantaneously alternately transmitted to said meter means;
   power supply means normally disconnected from said meter means; and
   switch means for selectively connecting said power supply means to said meter means in lieu of said generator means to facilitate calibration of said meter means.

3. In a vehicle testing device, the combination comprising:
   roll means adapted to support and be driven by vehicle wheels; generator means connected to said roll means to be driven thereby;
   load absorption means connected to said roll means;
   means for variably loading said load absorption means;
   speed meter means;
   power meter means;
   electric circuit means connecting said generator means to said speed meter means and both said generator means and said load absorption means to said power meter means;
   calibration means connected to said meter means;
   a power supply normally disconnected from said meter means;
   switch means for selectively connecting said power supply means to said meter means in said electrical circuit means;
   means operatively associated with said power supply means for adjusting the same at a time when the rolls are not driven to a value as indicated by said speed meter means equal to the current said generator means would supply if said rolls were driven at a predetermined speed; and
   means for applying a simulated known load to said load absorption means;
   the last-named means and said power supply adjusting means imparting a predetermined power input to said power meter means to facilitate calibration of the same.

4. In a device according to claim 3, said calibration means including first means for adjusting said power meter means to zero when zero load is applied to said load absorption means and second means for adjusting said power meter means to a predetermined reading when said power supply means supplies a predetermined current and said simulated load applying means applies a predetermined load to said load absorption means.

5. In a device according to claim 3, first and second sets of said roll means, a pair of said generator means connected respectively to said sets of roll means, a pair of load absorption means connected respectively to said sets of roll means, said electrical circuit means including calibration means for the generator means and the load absorption means connected to each set of rolls, and switch means in said electrical circuit means for selectively connecting the generator means and the load absorption means connected to each set of rolls and the respective calibration means to said meter means.

6. In a device according to claim 5, the last-named switch means and the means for variably loading said load absorption means being mounted in a hand held portable instrument.

References Cited

UNITED STATES PATENTS

| | | | |
|---|---|---|---|
| 2,130,833 | 9/1938 | Bennett | 73—123 X |
| 2,444,014 | 6/1948 | Williams | 73—118 X |
| 2,716,339 | 8/1955 | Cline | 73—117 |
| 2,828,624 | 4/1958 | Bennett | 73—117 |
| 3,238,771 | 3/1966 | Myrtetus et al. | 73—117 |
| 3,289,471 | 12/1966 | Maxwell | 73—117 |
| 2,535,279 | 12/1950 | Folk | 324—115 X |
| 2,874,354 | 2/1959 | Bell | 324—115 X |
| 3,058,062 | 10/1962 | Parmater et al. | 324—115 X |

RICHARD C. QUEISSER, *Primary Examiner.*

JERRY W. MYRACLE, *Assistant Examiner.*